US011804660B2

(12) United States Patent
Gu et al.

(10) Patent No.: US 11,804,660 B2
(45) Date of Patent: Oct. 31, 2023

(54) ANTENNA FOR INTEGRATION WITH A DISPLAY

(71) Applicant: HUAWEI TECHNOLOGIES CO., LTD., Guangdong (CN)

(72) Inventors: Huanhuan Gu, Oakville (CA); Morris Repeta, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1285 days.

(21) Appl. No.: 16/284,380

(22) Filed: Feb. 25, 2019

(65) Prior Publication Data

US 2020/0274250 A1     Aug. 27, 2020

(51) Int. Cl.
*H01Q 21/00* (2006.01)
*H01Q 1/22* (2006.01)
*G06F 1/16* (2006.01)

(52) U.S. Cl.
CPC ......... *H01Q 21/005* (2013.01); *G06F 1/1698* (2013.01); *H01Q 1/2266* (2013.01)

(58) Field of Classification Search
CPC ........................... H01Q 21/005; H01Q 1/2266
See application file for complete search history.

(56) References Cited

U.S. PATENT DOCUMENTS

| | | | |
|---|---|---|---|
| 8,149,177 B1 * | 4/2012 | Callus .................. | H01Q 21/005 343/705 |
| 8,213,757 B2 * | 7/2012 | Harrysson .............. | H01Q 1/243 385/120 |
| 9,006,661 B1 | 4/2015 | Newman et al. | |
| 9,553,352 B2 * | 1/2017 | Pan ........................ | H01Q 1/243 |
| 2010/0260460 A1 | 10/2010 | Harrysson et al. | |
| 2011/0320295 A1 | 12/2011 | Johnson, Jr. et al. | |
| 2012/0019419 A1 | 1/2012 | Prat et al. | |
| 2016/0226131 A1 | 8/2016 | McMilin et al. | |

(Continued)

FOREIGN PATENT DOCUMENTS

CN     101889226 A     11/2010
CN     102064380 A     5/2011
(Continued)

OTHER PUBLICATIONS

Hong et al., "Optically Invisible Antenna Integrated Within an OLED Touch Display Panel for IoT Applications," in IEEE Transactions on Antennas and Propagation, Jul. 2017, vol. 65, No. 7, pp. 3750-3755.

(Continued)

*Primary Examiner* — Sung H Pak
(74) *Attorney, Agent, or Firm* — BCF LLP

(57) ABSTRACT

The disclosed systems, structures, and methods are directed to antennas for integration with a display structure which has a plurality of pixels arranged in pixel rows with an inter-pixel spacing, and a feeding line located in the inter-pixel spacing. The display structure also has an antenna which comprises a slotted waveguide and a substrate. The slotted waveguide is located in the inter-pixel spacing and defines a plurality of slots configured to radiate electromagnetic waves. The substrate is attached to the slotted waveguide and is located between the feeding line and the slotted waveguide. The antenna may also include a plurality of slotted waveguides superposing on different feeding lines of the display structure.

14 Claims, 10 Drawing Sheets

(56) References Cited

U.S. PATENT DOCUMENTS

| | | |
|---|---|---|
| 2017/0110787 A1 | 4/2017 | Ouyang et al. |
| 2017/0309988 A1 | 10/2017 | Samardzija et al. |
| 2018/0275789 A1 | 9/2018 | Chai et al. |
| 2019/0198979 A1 | 6/2019 | Cao et al. |

FOREIGN PATENT DOCUMENTS

| | | |
|---|---|---|
| CN | 204539638 U | 8/2015 |
| CN | 105470632 A | 4/2016 |
| CN | 106058475 A | 10/2016 |
| CN | 106950748 A | 7/2017 |
| CN | 107667428 A | 2/2018 |
| CN | 108767445 A | 11/2018 |
| EP | 3304872 A1 | 4/2018 |
| WO | 2019027125 A1 | 2/2019 |

OTHER PUBLICATIONS

Hong et al., "Invisible antennas using mesoscale conductive polymer wires embedded within OLED displays," 2017 11th European Conference on Antennas and Propagation (EUCAP), Paris, 2017, pp. 2809-2811.

G. McKerricher et al.,"Lightweight 3D Printed Microwave Waveguides and Waveguide Slot Antenna",2015IEEE, total:2pages.

Wenyao Zhai et al.,"Dual Band Millimeter-Wave Interleaved Antenna Array Exploiting Low Cost PCB Technology for High Speed SG Communication",Aug. 1, 2016,total:4pages.

Office Action issued from the Chinese Patent Office dated Jan. 18, 2022 in connection with the corresponding application No. 202080013205.7.

Notice of Allowance dated Oct. 18, 2022 by the Chinese Patent Office in connection with the corresponding application No. 202080013205.7.

Mei Jiang et al.,"A THz Slotted-Waveguide Array Antenna Based on MEMS Technology",Date Added to IEEE Xplore: Nov. 19, 2018 ,total:3pages.

European Search Report of corresponding Application No. 20763658.0 issued by the EPO dated Feb. 14, 2022.

International Search Report and Written Opinion of PCT/CN2020/076087 issued from the ISA/CN; Jing Ma; dated May 11, 2020.

\* cited by examiner

ANTENNA FOR INTEGRATION WITH A DISPLAY

CROSS-REFERENCE TO RELATED APPLICATIONS

This is the first application filed for the instantly disclosed technology.

FIELD OF THE INVENTION

The present invention generally relates to the field of antennas and in particular to antennas integrated with display screens.

BACKGROUND

There is a market demand to make electronic communication devices more compact while maintaining full functionality to service user needs. There are, however, major engineering challenges in reducing the dimensions and integration of various components to achieve these demands.

The ability of a device to provide wireless connectivity at different frequencies is important, as is the reduction of the size of the device (without moving to a smaller screen). In many ways, these are two different competing interests that must be resolved to satisfy consumer demands.

In order to meet these expectations, integrating an antenna with a display screen appears to be a viable configuration. However, such an antenna needs to be invisible to the user, as well as being compact and provide adequate radiation and steering characteristics.

SUMMARY

An object of the present disclosure is to provide an antenna for integration with a display of an electronic device and a display structure having the antenna. In accordance with this objective, an aspect of the present disclosure provides an antenna for integration with a display structure, the display structure having a plurality of pixels arranged in pixel rows, each two neighboring pixel rows having an inter-pixel spacing for a feeding line therebetween. In another aspect, the present disclosure provides a display structure.

In accordance with at least one embodiment, the display structure comprises a plurality of pixels arranged in pixel rows, each two neighboring pixel rows having an inter-pixel spacing therebetween; a feeding line located in the inter-pixel spacing; and an antenna. The feeding line is configured to deliver an electrical signal to the pixel rows. The antenna comprises a slotted waveguide located in the inter-pixel spacing, the slotted waveguide defining a plurality of slots configured to radiate electromagnetic waves; and a substrate attached to the slotted waveguide and located between the feeding line and the slotted waveguide, the substrate being configured to deliver another electrical signal to the slotted waveguide.

The slotted waveguide may be made of graphene. The slotted waveguide may be made of an optically transparent material and may be configured to lay over the pixel rows.

The substrate may be made of an optically transparent material. The substrate may be configured to act as a capacitance. The substrate may be configured to deliver the electrical signal to the pixel rows of the display structure.

The display structure may further comprise a feeding probe embedded within the substrate, the feeding probe being configured to deliver the another electrical signal from the feeding line to the slotted waveguide.

The display structure may further comprise a coating layered over the slotted waveguide. The coating may be made of an antireflective optically transparent material.

In accordance with additional aspects of the present disclosure, there is provided a display structure with a plurality of slotted waveguides and feeding lines. Each of the plurality of slotted waveguides may superpose on different feeding lines of the display structure. Each two neighboring slotted waveguides of the plurality of slotted waveguides may have a filler therebetween.

The display structure may further comprise at least one phase shifter configured to alter phases of the other electrical signal delivered to each of the plurality of slotted waveguides.

The plurality of slotted waveguides may be embedded in the substrate. The display structure may further comprise a coating configured to overlay the plurality of slotted waveguides and the pixel rows.

BRIEF DESCRIPTION OF THE FIGURES

The features and advantages of the present disclosure will become apparent from the following detailed description, taken in combination with the appended drawings, in which.

Figure 1:
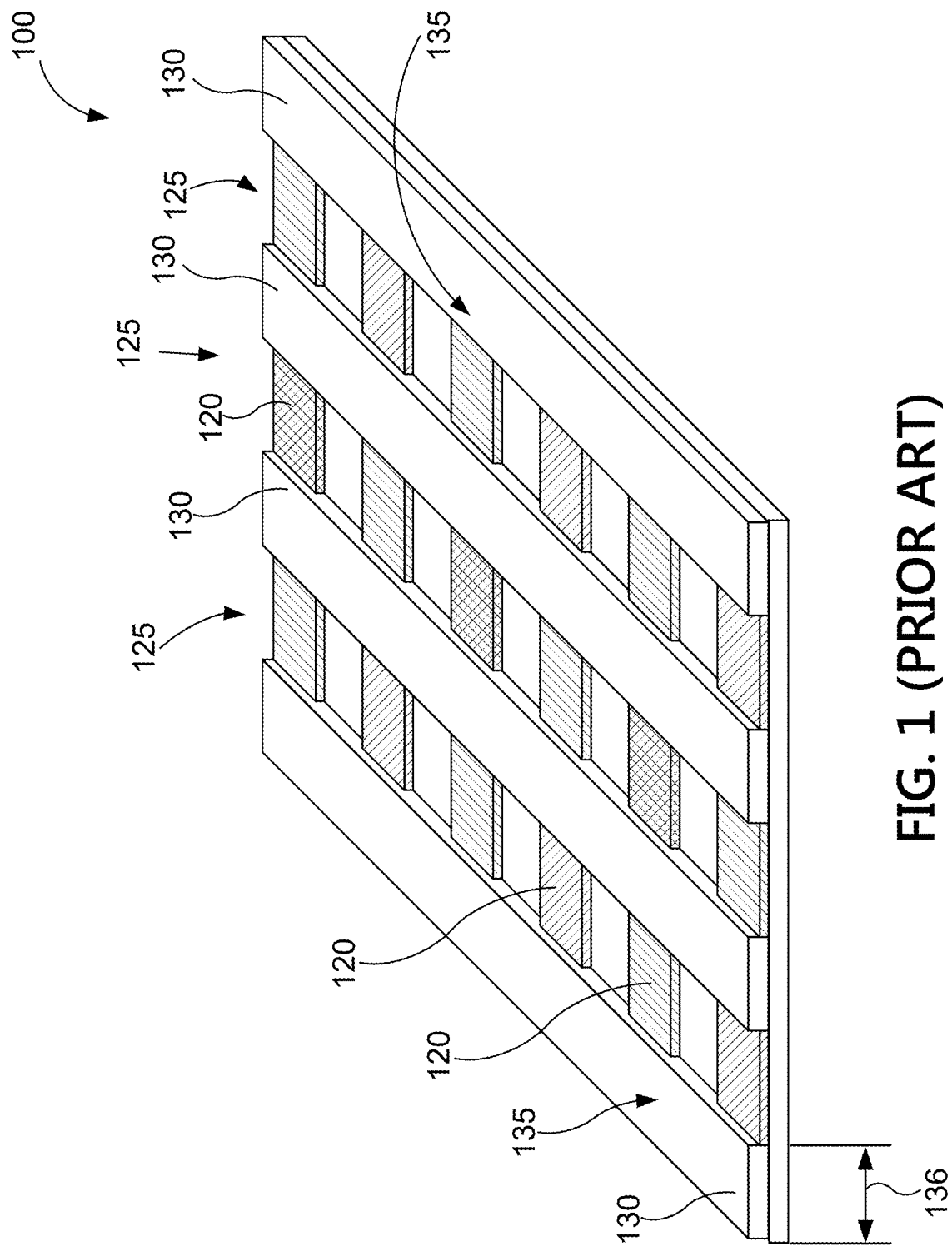
FIG. 1 (PRIOR ART) depicts a conventional display structure.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

As used herein, the term "about" or "approximately" refers to a +/−10% variation from the nominal value. It is to be understood that such a variation is always included in a given value provided herein, whether or not it is specifically referred to.

Unless otherwise defined, all technical and scientific terms used herein have the same meaning as commonly understood by one of ordinary skill in the art to which the described embodiments appertain to.

The instant disclosure is directed to an antenna that may be integrated into a display screen of an electronic device. The electronic device may include, without limitation, a smart-type phone, a watch, a computer tablet, etc.

In particular, the antenna as described herein may be integrated with the display having rows of pixels fed by feeding lines located in between pixel rows. Such a configuration of pixels and feeding lines is typically implemented in organic light emitting diode (OLED) displays. The disclosed antenna aligns antenna waveguides with the gaps between the rows of pixels in the display. Either through the placement of the waveguides or the manufacture of the waveguides, visual impairment of the screen is minimized. In some embodiments, the placement of the waveguides can be done to take advantage of space unused by pixels in the display screen. This effectively locates the waveguides in the inter-pixel gaps (also referred to herein as "inter-pixel spacings") which effectively renders them invisible to the user. In some embodiments, a waveguide is aligned with the inter-pixel gaps and fabricated of a material that is optically transparent. The alignment of such a waveguide can allow the use of the inter-pixel gap to house the feeding structure needed for the waveguide. The antenna is configured to transmit and receive electromagnetic (EM) waves, and in particular, terahertz (THz)-based frequency waves. Terahertz waves include electromagnetic waves with frequencies between about 1 THz and 10 THz. It should be understood that the frequency of the antenna may be a function of the spacing between the antenna waveguide elements.

FIG. 1 (PRIOR ART) depicts a display structure 100, representing an OLED display screen. Generally, display structure 100 has a plurality of pixels 120 arranged into pixel rows 125. The pixel rows 125 are separated between each other by feeding lines 130, which fill an inter-pixel spacing 135. The display structure 100 is sandwiched between other layers of the display of the electronic device. The other layers of the display may include, for example, a polarizer, a touch sensor panel, a front glass, etc.

The feeding lines 130 of display structure 100 are configured to provide electric current and voltage to pixels 120. For example, feeding line 130 may be a thin film transistor (TFT) circuit. It should be understood that feeding lines 130 may be narrower than inter-pixel spacing 135. Moreover, pixel rows 125 in OLED display usually have a width of about 15 micrometers (μm) to about 20 μm. The width of feeding line 130 in OLED display is usually between about 15 μm and about 20 μm.

Figure 2:
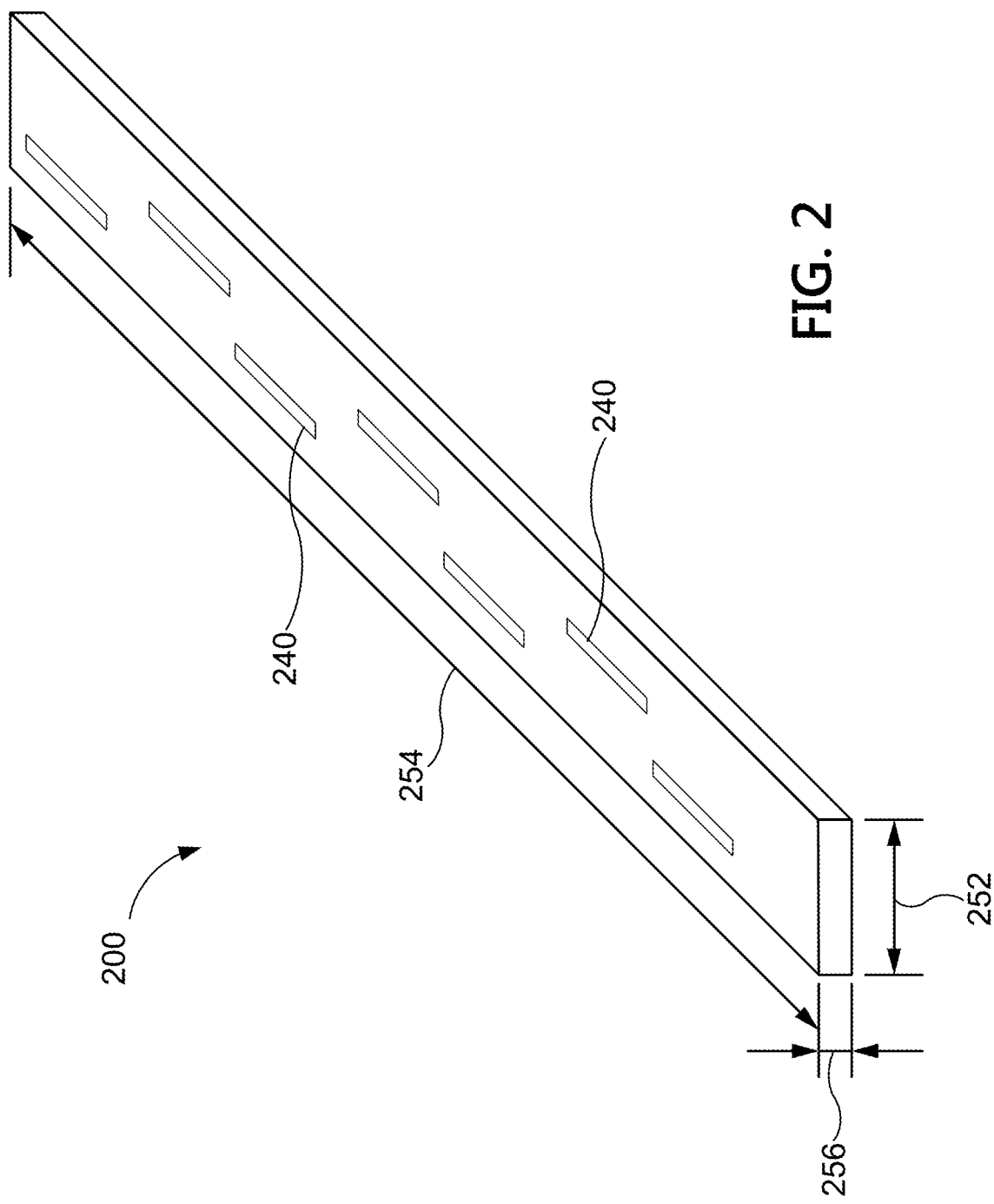
FIG. 2 depicts a perspective view a slotted waveguide, in accordance with various embodiments of the present disclosure.

FIG. 2 depicts a slotted waveguide 200, in accordance with various embodiments of the present disclosure. The slotted waveguide 200 is configured with a plurality of slots 240 which operate to radiate and receive electromagnetic waves when slotted waveguide 200 is actuated by current or voltage.

In at least one embodiment, slots 240 are located along the length of slotted waveguide 200. The slots 240 may be arranged in one row, or two rows, as illustrated in FIG. 2, or more rows. The slots 240 may also be inclined with regards to the longer sides of the slotted waveguide 200.

The length of one slot 240 may be about 30 m, while the width of one slot 240 may be about 1 μm. The slots 240 may have identical dimensions and identical shapes. To radiate at same frequency, the dimensions of slots 240 are identical. The spacing between slots 240 may be about 30 m.

A length 254 of slotted waveguide 200 and the number of slots 240 that may be located thereon determine the radiation gain of EM wave. For example, length 254 of slotted waveguide 200 may be about 260 μm. The length of slotted waveguide 200 may be increased in order to obtain higher gain.

The height 256 of slotted waveguide 200 may depend on the material being used. The slotted waveguide 200 may be made of metal-based materials, such as aluminum, in which case, the height 256 of slotted waveguide 200 may be a few micrometers. For example, height 256 may be about 2.5 μm. After slots 240 are etched into waveguide 200 they may be filled with a dielectric material, such as, for example, a polymer, oxide or nitride, or a composition thereof.

In some embodiments, slotted waveguide 200 is made of materials such as graphene. Graphene exhibits low resistance properties and may be optically transparent. The slotted waveguide 200 made of graphene may have the height as small as of 1 atom. A graphene-based slotted waveguide 200 may be a mono-layer, and thus may be very thin and optically transparent. This is particularly important when integrating an antenna having the slotted waveguide 200 with the display.

Figure 3:
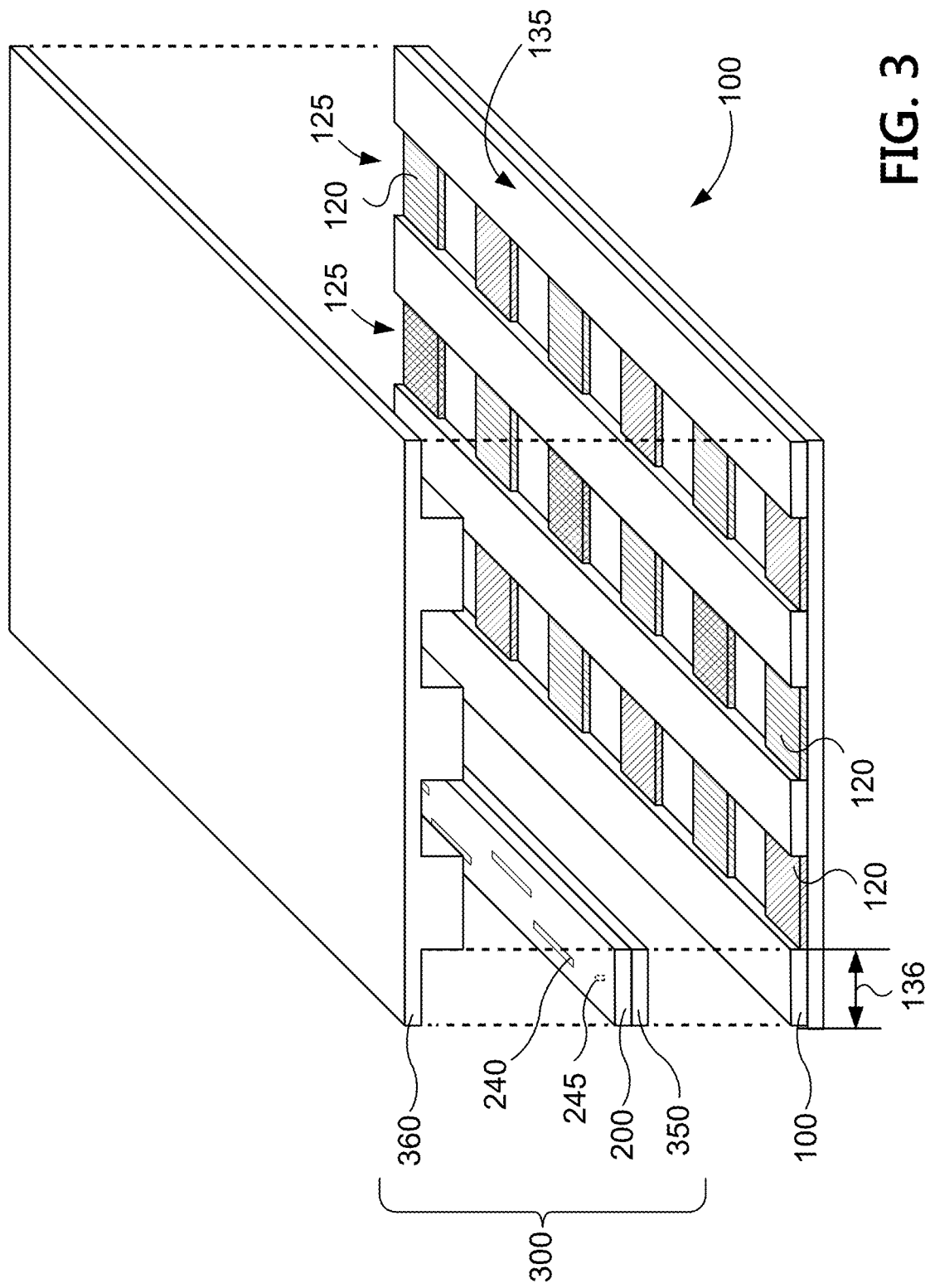
FIG. 3 depicts an exploded perspective view of a slotted waveguide antenna having one slotted waveguide and integrated with the display structure, in accordance with various embodiments of the present disclosure.

FIG. 3 depicts an exploded perspective view of a slotted waveguide antenna 300 (also referred to herein as antenna 300) having one slotted waveguide 200 and integrated with display structure 100, in accordance with various embodiments of the present disclosure.

The antenna 300 comprises slotted waveguide 200 and a substrate 350. The substrate 350 is attached to one surface of slotted waveguide 200. The antenna 300 may also include a coating 360 attached to the opposite surface of slotted waveguide 200.

The substrate 350 is configured to deliver an electrical signal to slotted waveguide 200 as described below. Moreover, due to its shape and, in some embodiments, material, substrate 350 may help to integrate antenna 300 with display structure 100. In some embodiments, substrate 350 may act as an electric capacitance. The substrate 350 may be optically transparent and may be made of a glass or a plastic, such as, for example, polyethylene terephthalate (PET).

The coating 360 may help to protect the slotted waveguide 200 from oxidation and level antenna 300 with the rest the display structure 100, including pixel rows 125. The coating 360 may be applied to fill over the top of pixels 120 and to make the entire surface of these two integrated components smooth. The coating 360 may be optically transparent and antireflective. Slotted waveguide 200 should not obscure the pixels within the display. As noted above, to avoid obscuring the pixels, the slotted waveguide 200 may be located in the inter-pixel spacing, or it may be fabricated from a material (such as a thin layer of graphene) that is optically transparent.

To integrate antenna 300 with display structure 100, slotted waveguide 200 is dimensioned to be positioned in between pixel rows 125 of display structure 100. The slotted waveguide 200 may fit into inter-pixel spacing 135 and is invisible to the user of the display, because it does not overshadow pixels 120. A width 252 of slotted waveguide 200 may be less than or approximately equal to width 136 of inter-pixel spacing 135.

As discussed above, height 256 of slotted waveguide 200 made of graphene may be as small as 1 atom. Such slotted waveguide 200 may be invisible to the user, which may permit to have slotted waveguides 200 wider than width 136 of inter-pixel space 135. Therefore, when slotted waveguide 200 is made of graphene, it may overlap with pixel rows 125.

Antenna 300 is fed by a feeding line. In some embodiments, the feeding line of antenna 300 may be provided by the feeding line 130 of OLED structure. In such embodiment, slotted waveguide 200 may be deposited over feeding line 130 of display structure 100. Alternatively, antenna 300, and in particular, substrate 350, may include a feeding structure, including a feeding electrical circuit. The substrate 350 may deliver an antenna-bound electrical signal to the slotted waveguide 200 via the feeding structure.

The feeding structure may be configured to deliver electrical signal to both pixel rows 125 and slotted waveguide 200.

The antenna 300 may be configured to operate with a current (voltage) delivered through the feeding structure. For example, the delivered current may be about 1 mA or less and the applied voltage may be less than 20 Volts. The feeding structure may include feeds, such as, for example, probe feeds 245 configured to deliver the antenna-bound electrical signal to slotted waveguides 200. In some embodiments, the feeds 245 may be connected to the bottom of each slotted waveguide 200 and embedded within substrate 350.

The antenna 300 may also have a feeding network (not shown). For example, the feeding network may be printed on a separate layer and put underneath OLED cathode layer. Alternatively, the feeding network may be located in a non-transparent region, such as on a side of the screen.

While OLED of display structure 100 is usually fed by currents oscillating in frequencies of less than 1 MHz (currently, the highest refresh rate of common displays is about 120 Hz while many displays operate at 60 Hz), slotted waveguides 200 are driven by a THz range signal. This difference in operating frequencies can be relied upon to result in minimal mutual interference between antenna 300 and display structure 100.

Figure 4:
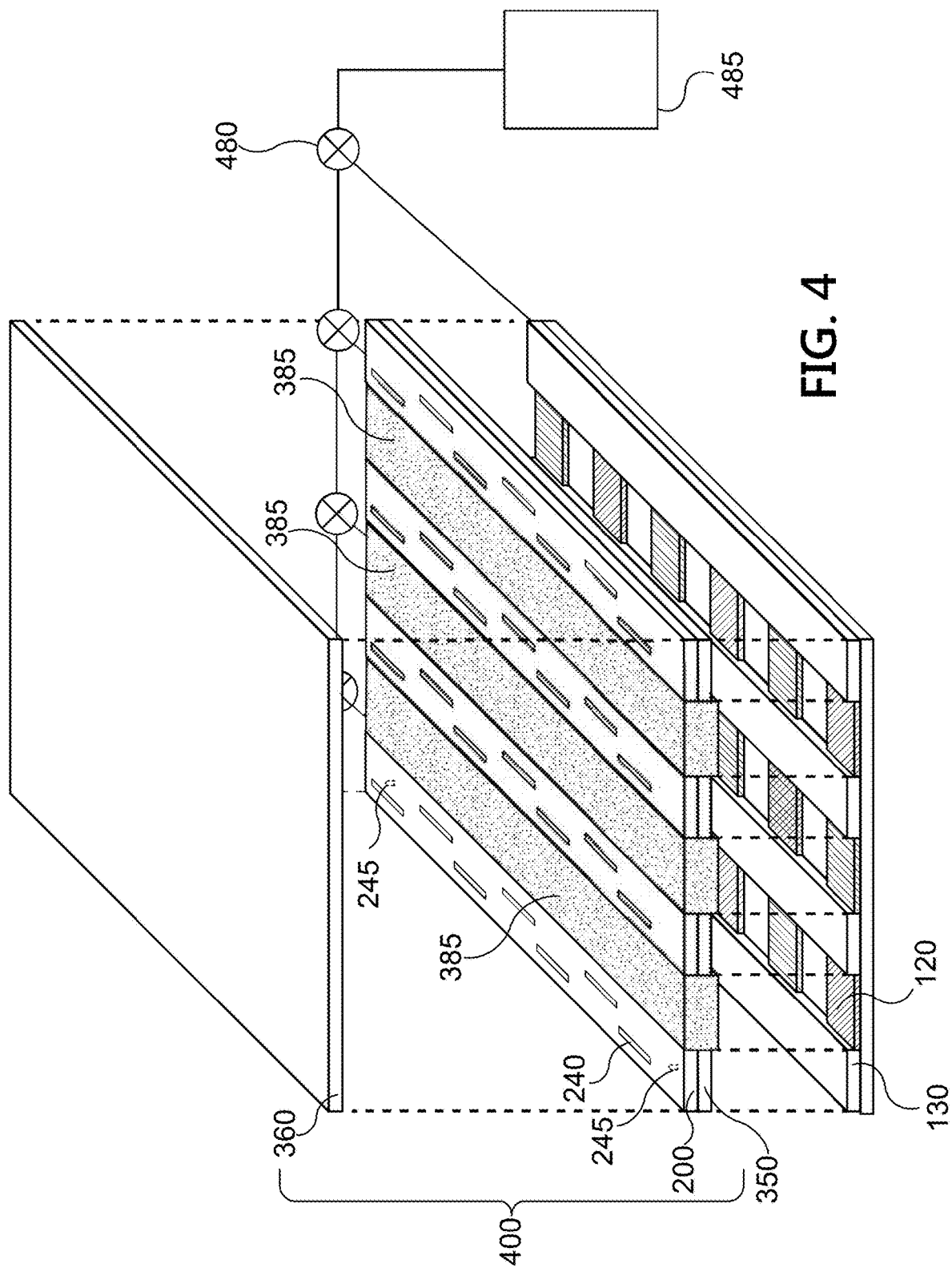
FIG. 4 depicts an exploded perspective view of an antenna having a plurality of slotted waveguides integrated with the display structure, in accordance with various embodiments of the present disclosure.

FIG. 4 depicts an exploded perspective view of antenna 400 having an array of slotted waveguides 200 integrated with display structure 100, in accordance with various embodiments of the present disclosure. By incorporating a plurality of slotted waveguides 200, antenna 400 provides improved radiating patterns and increased gains.

The slotted waveguides 200 of antenna 400 may have similar or different sizes of slots 240, and, therefore, may manifest similar or different resonant frequencies that determine the antenna's radiating frequencies.

The space between slotted waveguides 200 in antenna 400 may be filled with a filler 385. The filler 385 may be made of an optically transparent material such as silicon oxide, silicon nitride, or any other suitable material including organic materials. It should be noted that substrate 350 and filler 385 may be made of the same or different materials.

In accordance with at least one embodiment, slotted waveguides 200 may be deposited on substrate 350. In some embodiments, substrate 350 may support one or more slotted waveguides 200, so that the space between slotted waveguides 200 is filled in with the substrate's material. The slotted waveguides 200 may be embedded within substrate 350.

As described above, coating 360 may be deposited over slotted waveguides 200 in order to cover both antenna 300 and display structure 100. In some embodiments, antenna 300 may have both an optically transparent substrate 350 and an optically transparent coating 360. The optically transparent substrate 350 and optically transparent coating 360 may be made of the same material as filler 385. In some other embodiments, antenna 300 may have either optically transparent substrate 350 or optically transparent coating 360.

Although slotted waveguides 200 are configured to align with feeding lines 130 and pixel rows 130, the spacing between slotted waveguides 200 in antenna 300 may vary. In some embodiments, slotted waveguides 200 may be deposited over each consecutive feeding line 130 of display structure 200. Alternatively, slotted waveguides 200 may be deposited on every second or third feeding line 130. The antenna 300 having slotted waveguides 200 on each feeding line 130 and the antenna (not shown) with slotted waveguides 200 deposited on every second or third feeding line 130 radiate THz waves at different frequencies.

Referring again to FIG. 4, in some embodiments, antenna 400 may also include one or more phase shifters 480 configured to alter the phase of the electrical signal delivered to each of slotted waveguides 200 of antenna 400. The phase shifters 480 may be operatively connected to a controller 485 which is configured to manage and control phase shifters 480. By controlling the phase of the electrical signal delivered to each of slotted waveguides 200 of antenna 400, the radiation beam of antenna 400 may be steered in various directions.

Figure 5:
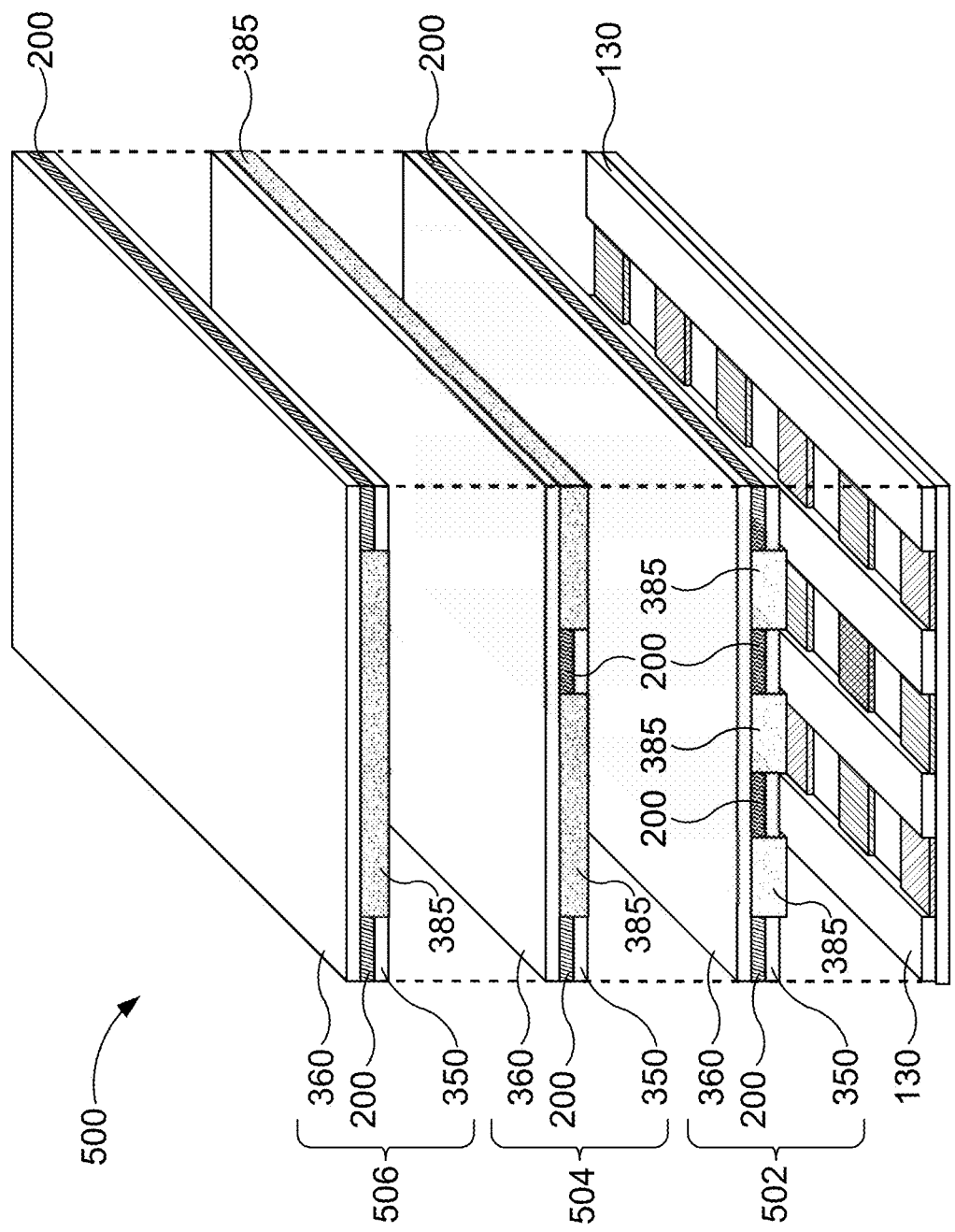
FIG. 5 depicts an exploded perspective view of a stacked antenna, in accordance with various embodiments of the present disclosure.

FIG. 5 depicts a stacked antenna 500, in accordance with various embodiments of the present disclosure. The stacked antenna 500 may have several antennas with one or more waveguides 200 stacked (interleaved) one on top of the other, as depicted in FIG. 5. Antennas 502, 504, 506 illustrated in FIG. 5 have different spacing between slotted waveguides 200.

The antennas 300, 400, 500 illustrated in FIG. 3-5 may be sandwiched between various layers of the display of the electronic device. For example, antennas 300, 400, 500 may be sandwiched between display structure 100 and a touch screen. Moreover, antennas 300, 400, 500 may be manufactured by photolithography or electroplating. Alternatively, antennas 300, 400, 500 may be deposited on display structure 100 by photolithography or electroplating.

The slotted waveguides 200 may act as a shielding structure, reducing the interference from other electromagnetic emission sources on the screen. The shield limits the radiation to slot locations, such that the antenna's radiation, and, for example, the OLED signals, or other undesired signals, do not interfere with each other.

Figure 6A:
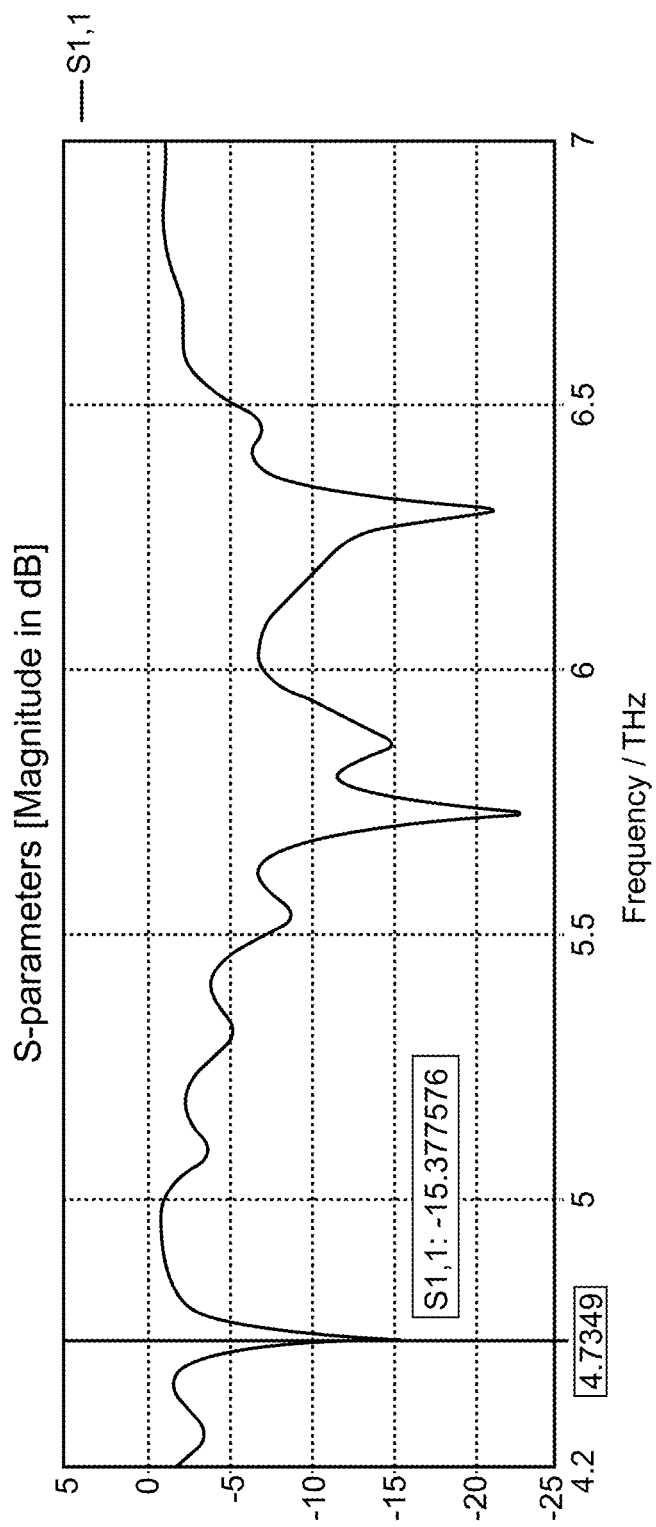
FIG. 6A depicts a reflection coefficient of the antenna with one slotted waveguide, in accordance with an embodiment of the present disclosure.

FIG. 6A depicts a reflection coefficient (i.e., $S_{11}$-parameter) of antenna 300 with only one slotted waveguide 200, in accordance with an embodiment of the present disclosure. The dimensions of slotted waveguide 200 were as follows: length of about 260 μm, width of about 20 μm, and height of about 2.5 μm. Moreover, the antenna 300 of the embodiment illustrated by FIG. 6A radiates EM waves at about 4.7 THz to about 5.8 THz. The return loss is below −6 dB in the frequency range between about 5.5 THz and about 6 THz. The antenna gain is approximately 11 dB.

Figure 6B:
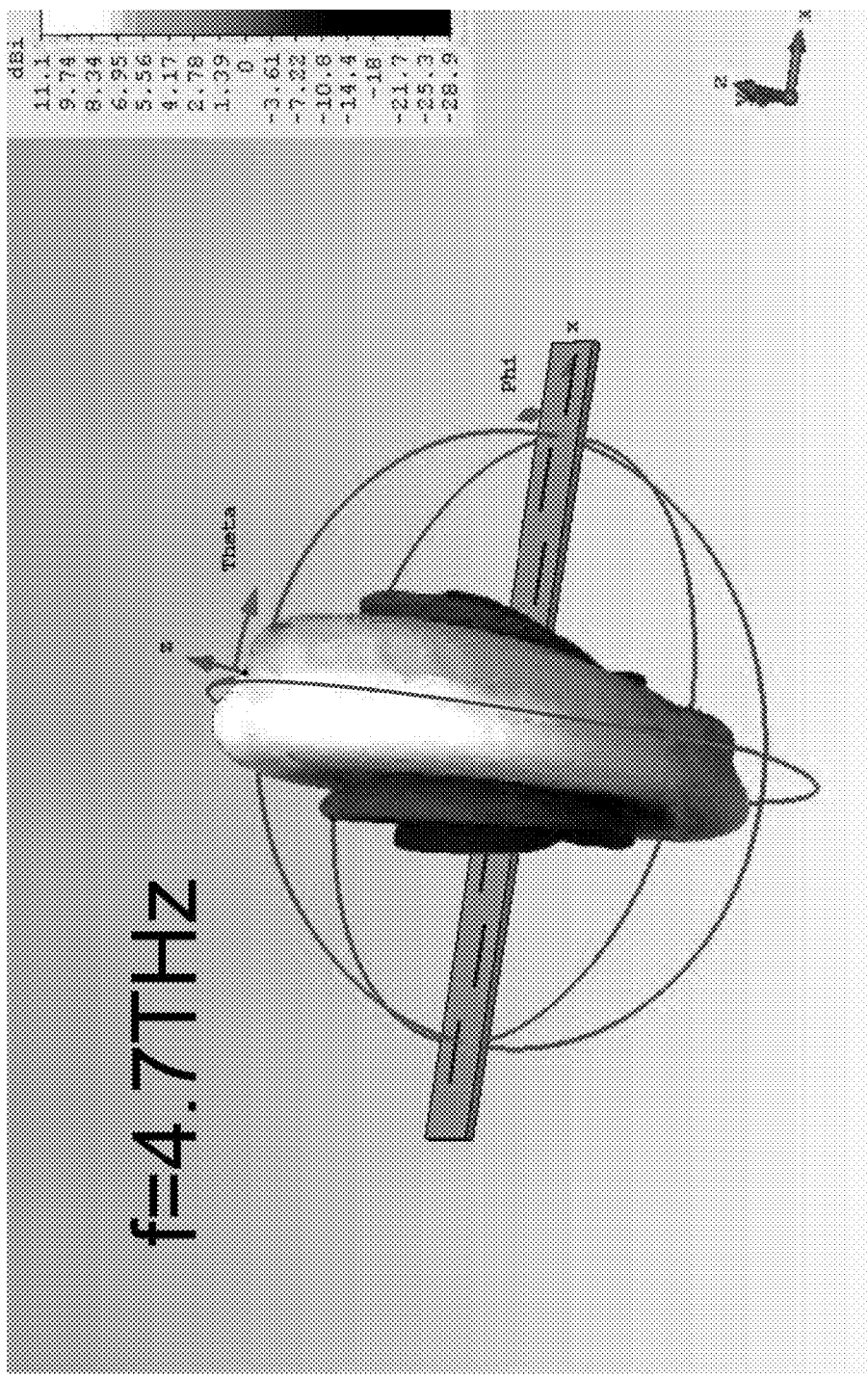
FIG. 6B depicts a radiation pattern at 4.7 terahertz (THz) of the antenna of FIG. 6A, in accordance with an embodiment of the present disclosure.
Figure 6C:
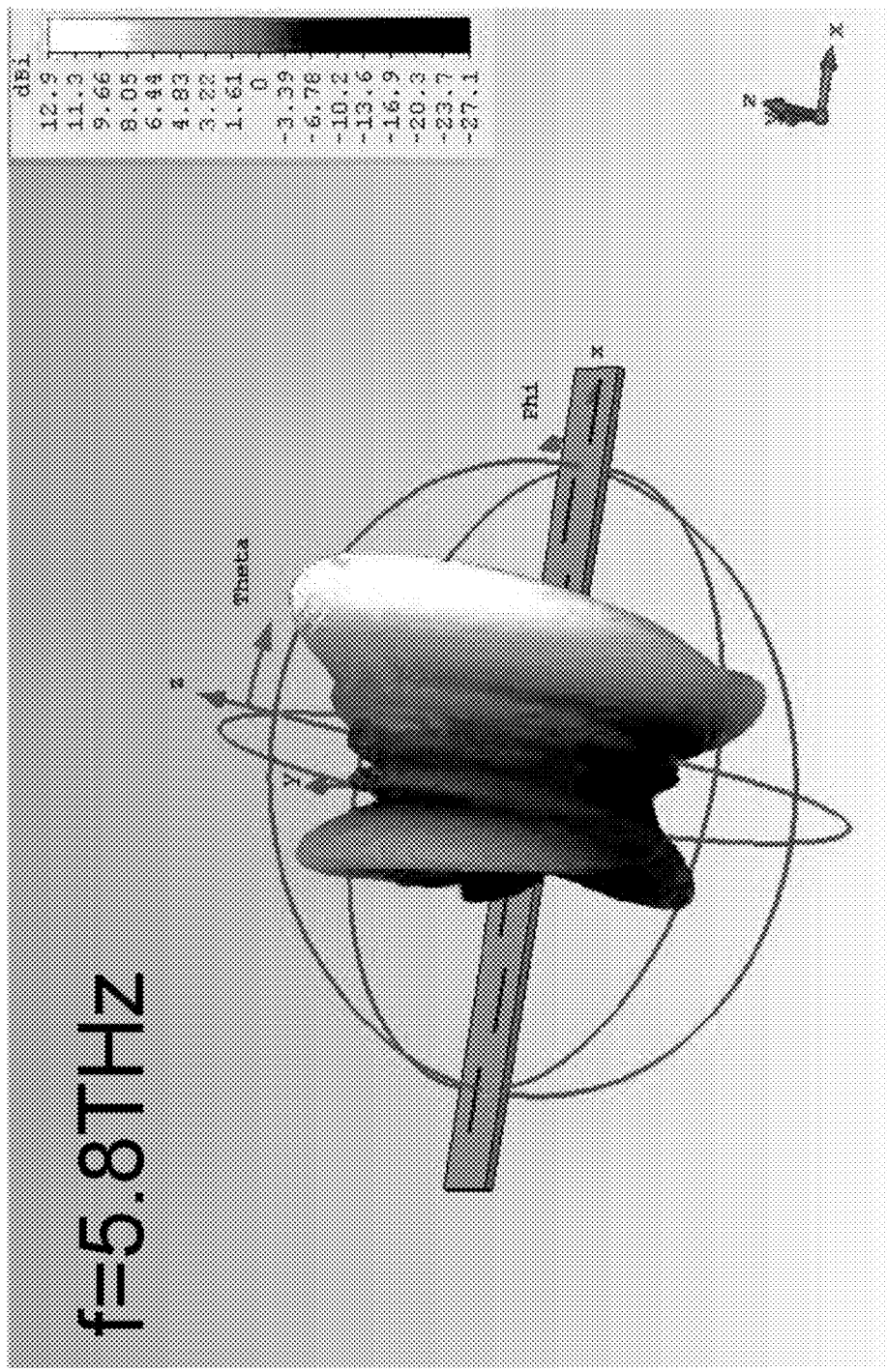
FIG. 6C depicts a radiation pattern at 5.8 THz of the antenna of FIG. 6A, in accordance with an embodiment of the present disclosure.

FIG. 6B depicts the radiation pattern of operating at 4.7 THz antenna 300 having the same structural dimensions and parameters as in FIG. 6A. FIG. 6C depicts the radiation pattern of operating at 5.8 THz antenna 300, also having the same dimensions and parameters as in FIG. 6A.

Figure 7A:
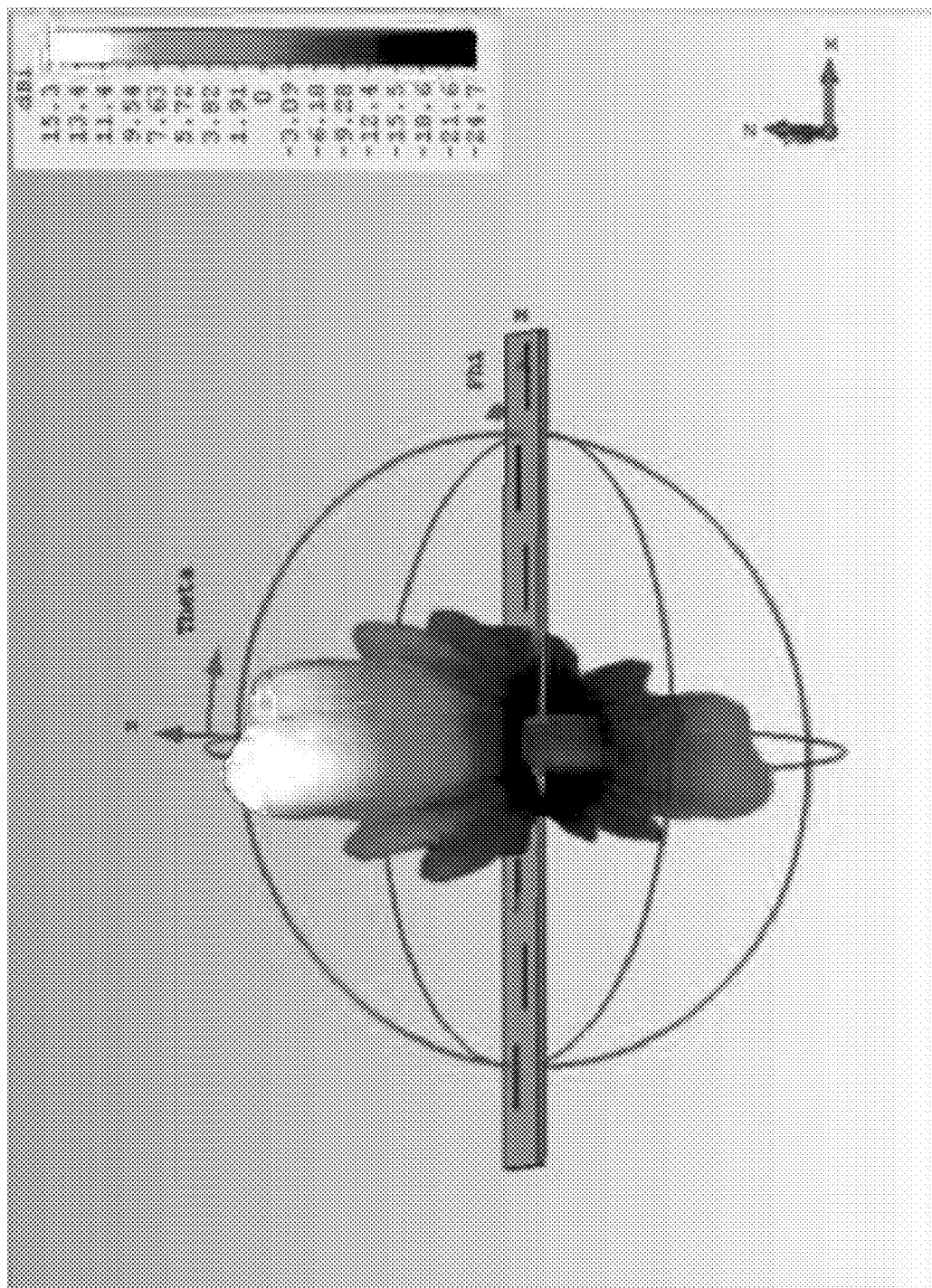
FIG. 7A depicts a radiation pattern of an antenna with several slotted waveguides, in accordance with various embodiments of the present disclosure.
Figure 7B:
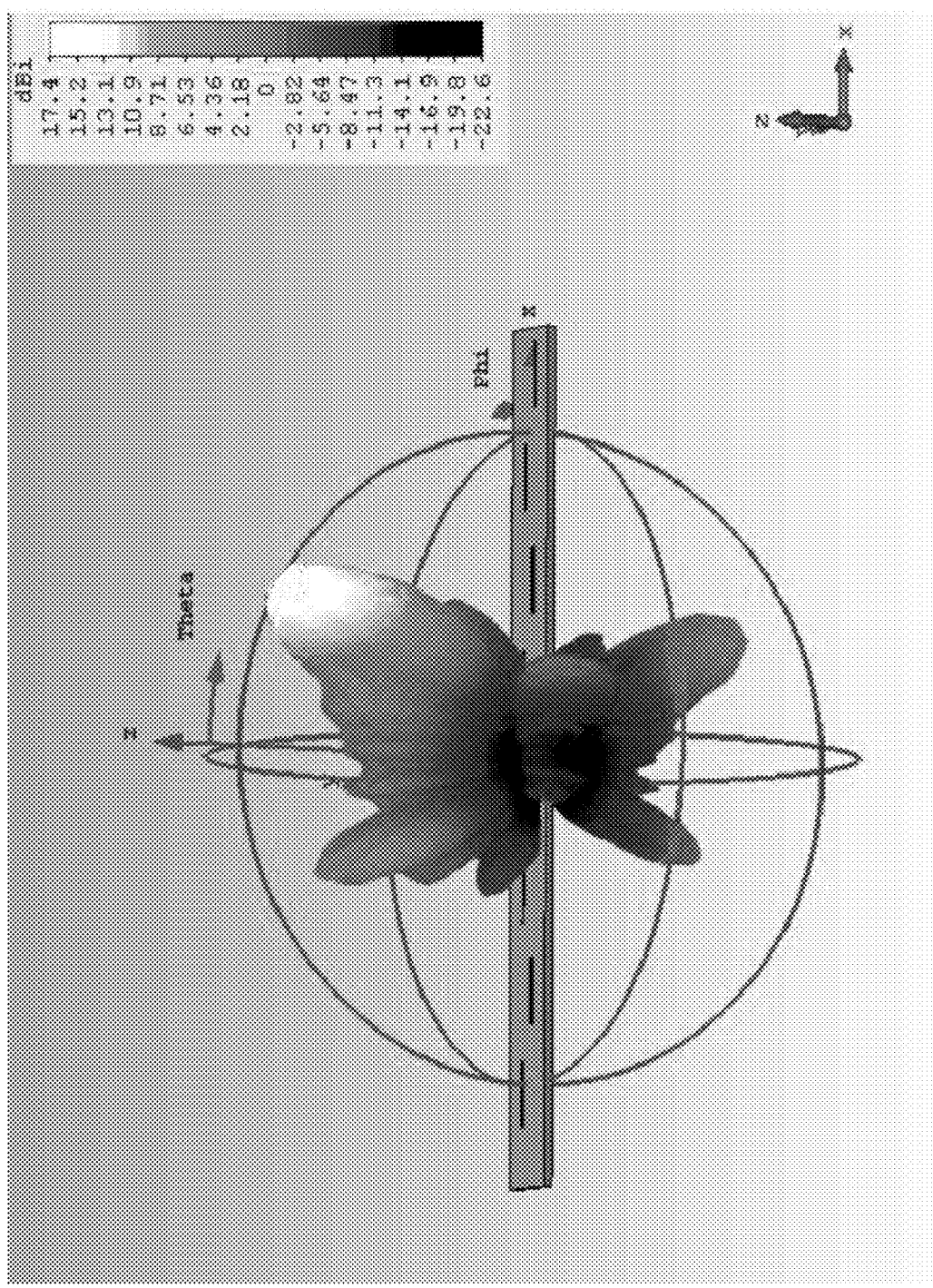
FIG. 7B depicts a steered radiation pattern of the antenna of FIG. 7A, in accordance with an embodiment of the present disclosure.

FIG. 7A depicts the radiation pattern of antenna 300 having 7 slotted waveguides 200, in accordance with various embodiments of the present disclosure. FIG. 7B illustrates the radiation pattern of antenna 300 illustrating the steering properties of phase shifters 480.

The drawings are not to scale and some features of embodiments shown and discussed are simplified or exaggerated for illustrating the principles of the embodiments disclosed.

It will also be understood that, although the inventive concepts and principles presented herein have been described with reference to specific features, structures, and embodiments, it is clear that various modifications and combinations may be made without departing from such disclosures. The specification and drawings are, accordingly, to be regarded simply as an illustration of the inventive concepts and principles as defined by the appended claims, and are contemplated to cover any and all modifications, variations, combinations or equivalents that fall within the scope of the present disclosure.

What is claimed is:

1. A display structure comprising:
  a plurality of pixels arranged in pixel rows, each two neighboring pixel rows having an inter-pixel spacing therebetween;
  a feeding line configured to deliver a first electrical signal to the pixel rows, the feeding line being located in the inter-pixel spacing; and
  an antenna comprising:
    a slotted waveguide located in the inter-pixel spacing, the slotted waveguide defining a plurality of slots configured to radiate electromagnetic waves; and
    a substrate attached to the slotted waveguide and located between the feeding line and the slotted waveguide, the substrate being configured to deliver a second electrical signal to the slotted waveguide.

2. The display structure of claim 1, wherein the slotted waveguide is made of graphene.

3. The display structure of claim 1, wherein the slotted waveguide is made of an optically transparent material and the slotted waveguide is configured to lay over the pixel rows.

4. The display structure of claim 1, wherein the substrate is made of an optically transparent material.

5. The display structure of claim 1, wherein the substrate is configured to act as a capacitance.

6. The display structure of claim 1, wherein the substrate is further configured to deliver the electrical signal to the pixel rows.

7. The display structure of claim 1, further comprising a feeding probe embedded within the substrate, the feeding probe being configured to deliver the another electrical signal from the feeding line to the slotted waveguide.

8. The display structure of claim 1, further comprising a coating layered over the slotted waveguide, the coating being made of an antireflective optically transparent material.

9. The display structure of claim 1, wherein the slotted waveguide is one of a plurality of slotted waveguides and the feeding line is one of a plurality of the feeding lines, each of the plurality of slotted waveguides superposing on different feeding lines.

10. The display structure of claim 9, further comprising at least one phase shifter configured to alter phases of electrical signals delivered to each of the plurality of slotted waveguides.

11. The display structure of claim 9, wherein each two neighboring slotted waveguides of the plurality of slotted waveguides have a filler therebetween.

12. The display structure of claim 9, wherein the plurality of slotted waveguides are embedded in the substrate.

13. The display structure of claim 9, further comprising a coating configured to overlay the plurality of slotted waveguides and the pixel rows.

14. The display structure of claim 1, wherein the electromagnetic waves are terahertz waves.

* * * * *